T. ABBOTT.
MEANS FOR OILING THE WHEELS OF TRAMWAY AND LIKE VEHICLES.
APPLICATION FILED JAN. 27, 1920.

1,351,196.

Patented Aug. 31, 1920.
2 SHEETS—SHEET 1.

INVENTOR
Tom Abbott
By Wm Wallace White
Att'y.

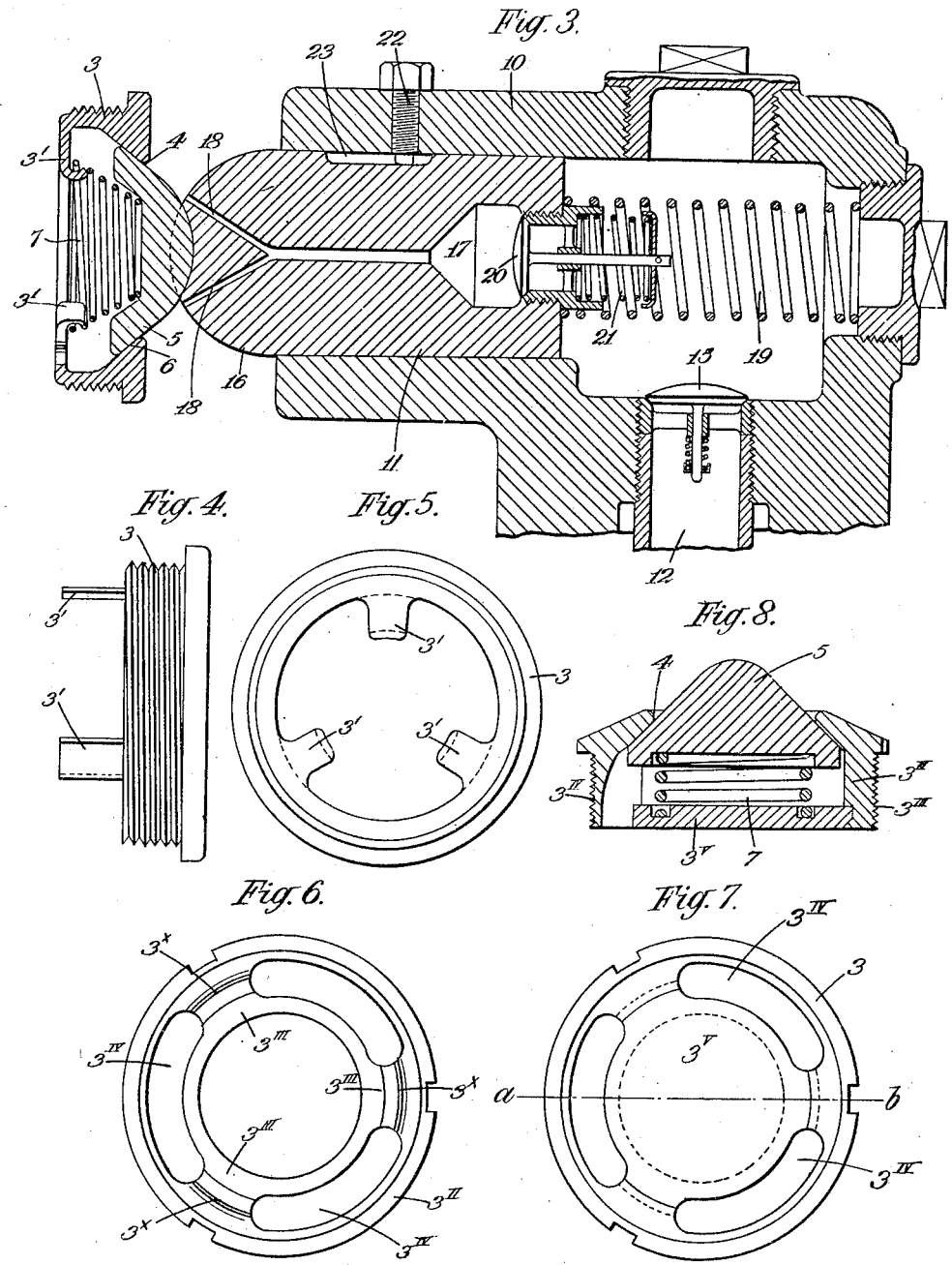

UNITED STATES PATENT OFFICE.

TOM ABBOTT, OF PONTYCLUN, LLANTRISANT, WALES.

MEANS FOR OILING THE WHEELS OF TRAMWAY AND LIKE VEHICLES.

1,351,196.      Specification of Letters Patent.      Patented Aug. 31, 1920.

Application filed January 27, 1920. Serial No. 354,489.

*To all whom it may concern:*

Be it known that I, TOM ABBOTT, a subject of the King of Great Britain and Ireland, residing at 30 Llantrisant Road, Pontyclun, Llantrisant, South Wales, have invented certain new and useful Improvements in Means for Oiling the Wheels of Tramway and like Vehicles, of which the following is a specification.

The invention consists of means for mechanically oiling the wheels of tramway vehicles used in mines and the wheels of other like vehicles.

The wheels of tramway vehicles used in mines are oiled by hand, which is necessarily somewhat expensive.

To avoid the expense of hand-oiling, it has been proposed to provide at the sides of a track for said vehicles, devices by which the wheels of the vehicles are automatically lubricated as the vehicles pass along the track.

The object of the present invention is to provide improved means for automatically lubricating the wheels of tramway vehicles and other like vehicles, which will be of simpler construction than those hitherto employed for the purpose.

This result is attained by providing the chambered hubs of said tramway and other like vehicles with spring-controlled plates, which are made of part-spherical shape on their front ends, and in providing at both sides of a track along which the vehicles are run oil pumps fitted with spring-controlled plungers which are formed with rounded noses to coöperate with said spring-controlled plates and are adapted, when said plates have been displaced, to project oil past said plates into the hubs of the wheels.

The invention is illustrated by the accompanying drawings.

Fig. 3 is a vertical section, drawn to an enlarged scale, of the upper part of one of the oil pumps and one of the spring-controlled plates and its housing.

Fig. 4 is a side view and Fig. 5 is a rear view of one construction of housing for the spring-controlled plates, the first figure showing the strips forming parts of said housing in the positions they occupy before they are bent and the second figure the positions of said strips after they have been bent.

Figs. 6 to 8 illustrate an alternative and preferred construction of housing for the spring-controlled plates, Fig. 6 being a rear view of the machined casting constituting the body or main part of said housing, Fig. 7 a rear view of the completed housing, and Fig. 8 a vertical section of the completed housing, taken on the line $a$—$b$ of Fig. 7.

Figure 1:
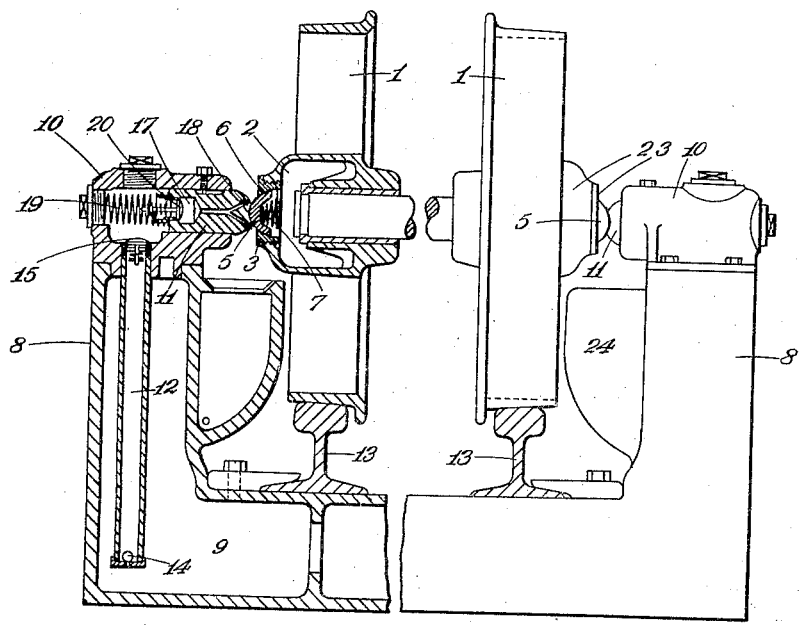
Figure 1 illustrates a general arrangement of parts which may be employed, the right half of the figure being in elevation and the left half thereof in vertical section.
Figure 2:
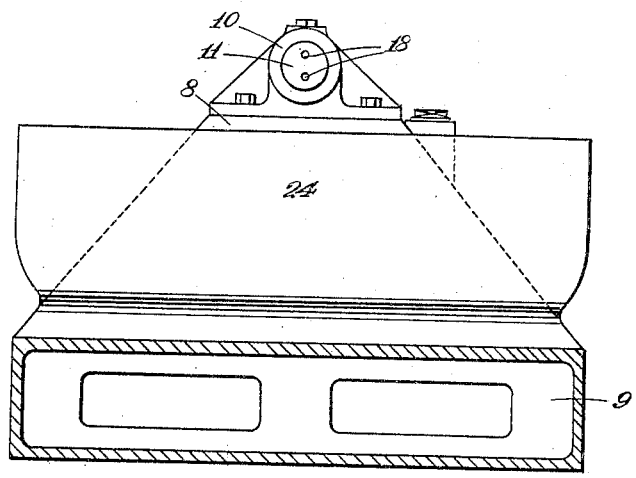
Fig. 2 is an elevation of one of the pumps, as seen from its inner side.

Referring now to these drawings, 1 are the two wheels of a tramway vehicle, such as is used in mines, and 2 are the chambered hubs of said wheels. 3 are housings screwed into the chambered hubs 2 and formed at their front ends with openings 4. 5 are plates closing the openings 4 and made of part-spherical shape at their front ends. 6 are seatings for the rear parts of the plates 5. 7 are springs by which the plates 5 are pressed against the seatings 6. 8 are oil pumps located at the sides of a track along which the vehicles pass. These pumps comprise wells 9, cylinders 10 secured to the upper ends of the wells 9, spring-controlled plungers 11, fitting the cylinders 10, and tubes 12 dipping into the oil wells 9 and opening into the cylinders 10. The oil wells 9 either form parts of a single casting of approximately U-shape, the central part of which serves as a support for the rails 13 of the track, or consist of two castings bolted to one another along the center line of said track, the object, in either case, being to insure that the center lines of the wheels 1 shall, as the latter pass along the rails 13, be in the same plane as the axes of the plungers 11. The dip-tubes 12 are provided with automatic foot-valves 14 and with automatic delivery valves 15. The plungers 11 are formed with rounded noses 16, with central cavities 17, and with radiating passages 18 communicating with the cavities 17, terminating at the noses 16 of the plungers 11, and arranged in line with the spaces which will obtain between the spring-controlled plates 5 and the seatings 6 when said plates are forced back, as hereinafter described. The plungers 11 are controlled by springs 19, bearing against the rear ends of said plungers and the opposite walls of the cylinders 10, and are supplied with oil through the medium of non-return valves 20 fitted to their bases and controlled by means of springs 21. The movement which can be given to the plungers 11 is limited, and rotation of said plungers is prevented, by means of screws 22 engaging with the walls of the cylinders 10 and with slots 23 formed in the sides of the plungers 11, see Fig. 3. The oil wells 9 are preferably provided at their inner sides with troughs 24, to catch any oil which may drip off the hubs 2 and off the noses 16 of the plungers 11.

The housings 3 may be constructed in one piece, as illustrated in the majority of the figures of the drawings, the housing being then, as shown in Fig. 4, provided at its rear with three or more strips $3^I$, which are bent into positions at right angles to the axis of the housing, as shown in Fig. 5.

Alternatively, as illustrated by Figs. 6 to 8, the housings 3 may be constructed of main parts consisting of castings $3^{II}$ which are provided on their interiors with spaced stepped walls $3^{III}$ separated by passages $3^{IV}$ for the oil projected into the housings, and of disks $3^V$ secured in position in the rear of the castings $3^{II}$. During the machining of the castings $3^{II}$, the stepped walls $3^{III}$ are shaped so as to fit the peripheral parts of the disks $3^V$, and ridges $3^X$ are left on the rear faces of the machined castings at the outer edges of the uppermost of the stepped walls $3^{III}$. After the springs 7 have been passed into the housings and the disks $3^V$ have been placed on the stepped walls $3^{III}$ the ridges $3^X$ are riveted over, as shown in Figs. 7 and 8, to secure the disks $3^V$ in position in the housings.

The parts coöperate as follows:—

When the wheels of a vehicle traveling on the rails 13 reach the pumps 8 the spring-controlled plates 5 will come in contact with the noses 16 of the plungers 11 and will be pressed back, owing to the springs 7 being weaker than the springs 19, thus leaving annular spaces between the spring-controlled plates 5 and the seatings 6. The cone-shaped noses of the members 5 and 11 overlap to such an extent that in passing, the spring 7 is fully compressed before the extreme ends of the noses have come into contact, so that, after the spring 7 has been fully compressed, continued movement of the vehicle forces the plunger 11 back against the tension of its spring 19, thereby opening the valve 20 and permitting oil to be forced through the passages 18 and projected into the housings 3. As the vehicle travels on, the plungers 11 will be returned by the springs 19 to their original positions and the valves 20 be closed, while, at the same time, the spring-controlled plates 5 will be again pressed against the seatings 6 by the springs 7.

The details incidental to the carrying out of the invention may be varied, and are not necessarily confined to those illustrated by the accompanying drawings.

Having now described my invention what I have invented, and desire to secure by Letters Patent of the United States is as follows:—

1. An oiling apparatus for track-guided vehicles, comprising a stationary cylinder located at right angles to the track, a spring-pressed plunger in said cylinder and provided with passages communicating with a source of oil supply, a spring-pressed plate adapted to be inserted in the hub of the vehicle wheel, and coöperating means carried by the plate and plunger for compressing both of said members against the action of their springs, thereby to permit the passage of oil from the plunger into the hub of the vehicle.

2. An oiling apparatus for track-guided vehicles, comprising a stationary cylinder located at right angles to the track, a spring-pressed plunger in said cylinder and provided with passages communicating with a source of oil supply, a spring-pressed plate adapted to be inserted in the hub of the vehicle wheel, said plate and plunger being provided with noses adapted to contact during the passage of the vehicle thereby to compress the plate and plunger against the action of their springs and permit the passage of oil from the plunger into the hub of the vehicle.

3. An oiling apparatus for track-guided vehicles, comprising a support for the tracks provided with a plurality of oil wells at each side of said track, a cylinder in communication with each of said oil wells and located transversely of the track, a spring-pressed plunger in said cylinder having passages in communication with its well, a valve in said plunger for controlling said passages, a spring-pressed plate adapted for insertion into the hub of the vehicle wheel, and coöperating means carried by said plunger and plate for compressing both of said members against the action of their springs and opening said valve thereby to permit passage of oil from the plunger into the hub of the vehicle.

4. An oiling apparatus for track-guided vehicles, comprising a plurality of oil wells at each side of the track, a cylinder in communication with each of said wells and located transversely of the track, a spring-pressed plunger in said cylinder and having passages in communication with its well, a valve in said plunger for controlling said passages, a housing adapted to be inserted into the hub of the vehicle wheel, a spring-pressed plate seated in said housing and adapted, when compressed, to permit passage of oil between it and the housing, said plate and plunger being provided with noses adapted to contact during the passage of the vehicle and compress the plate and plunger against the action of their springs, thereby to open said valve and permit passage of oil from the plunger into the hub of the vehicle.

TOM ABBOTT.